United States Patent [19]
Jeffords et al.

[11] Patent Number: 6,041,383
[45] Date of Patent: *Mar. 21, 2000

[54] ESTABLISHING CONTROL OF LOCK TOKEN FOR SHARED OBJECTS UPON APPROVAL MESSAGES FROM ALL OTHER PROCESSES

[75] Inventors: Jason Jeffords, Dover; Todd A. Crowley, Windham; Roger Dev, Durham, all of N.H.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,040

[22] Filed: Jul. 22, 1996

[51] Int. Cl.$^7$ ..................................................... G06F 13/37
[52] U.S. Cl. .......................... 710/200; 709/229; 370/447
[58] Field of Search ..................................... 395/674, 726, 395/800.28, 200.59; 370/447; 710/200; 709/229

[56] References Cited

U.S. PATENT DOCUMENTS

| | | | |
|---|---|---|---|
| 4,399,504 | 8/1983 | Obermarck et al. | 710/200 |
| 4,598,285 | 7/1986 | Hoshen | 340/825.5 |
| 4,949,337 | 8/1990 | Aggers et al. | 370/451 |
| 5,060,144 | 10/1991 | Sipple et al. | 710/200 |
| 5,155,725 | 10/1992 | Khalil | 370/455 |
| 5,161,227 | 11/1992 | Dias et al. | 709/104 |
| 5,167,022 | 11/1992 | Bahr et al. | 710/108 |
| 5,226,143 | 7/1993 | Baird et al. | 711/145 |

(List continued on next page.)

FOREIGN PATENT DOCUMENTS

| | | |
|---|---|---|
| 0 457 116 A2 | 11/1991 | European Pat. Off. . |
| 0 665 495 A2 | 8/1995 | European Pat. Off. . |

OTHER PUBLICATIONS

Bal, Henri E., "Replication Techniques for Speeding Up Parallel Applications", Aug. 1992.
Groupe Bull, "Object Transaction Service," Jun. 1994.
International Business Machines Corporation, "Transaction Service Proposal," Nov. 1993, Appendix E. Relationship to the X/Open DTP Model.
Dipippo et al., "Object–Based Semantic Real–Time Concurrency Control, " Proceedings of the Real Time Systems Symposium, Raleigh, Durham, No. Carolina USA, Dec. 1–3, 1993, Dec. 1, 1993, Inst. of Electrical and Electronics Engineers, pp. 87–96.
A. Gupta, et al., "Reliable Garbage Collection in Distributed Object Oriented Systems", IEEE, pp. 324–328, 1988.
Open Software Foundation, "NORMA IPC Version Two: Architecture and Design", Oct. 14, 1994.
P. Guedes, et al., "Writing a Client–Server Application in C ++", Mach Bibliography, School of Computer Science, Carnegie Mellon University, 1992.
T. Christopher, "Reference Count Garbage Collection", Software Practice and Experience, vol. 14(6), pp. 503–507, 1984.
J. Martin, "Explicit Reference Counts", IEEE, pp. 707–710, 1996.

*Primary Examiner*—Kenneth S. Kim
*Attorney, Agent, or Firm*—Wolf, Greenfield & Sacks, P.C.

[57] ABSTRACT

A system and method for controlling access to a shared object among a plurality of interconnected processes. A lock token is associated with a shared object. In order for a process to access or modify the associated object, it must possess the lock token. Whenever a process establishes control of the lock token, it transmits a message to each other process indicating that the process controls the lock token. In some instances, in order for a process to establish control of the lock token, the process must receive approval from each other process. Further, when two or more processes request the lock token at the same time, neither process will gain control and each process will then wait for a random time period before again seeking control of the token.

17 Claims, 7 Drawing Sheets

U.S. PATENT DOCUMENTS

| | | | |
|---|---|---|---|
| 5,263,155 | 11/1993 | Wang | 707/8 |
| 5,333,319 | 7/1994 | Silen | 709/103 |
| 5,408,629 | 4/1995 | Tsuchiya et al. | 711/151 |
| 5,414,700 | 5/1995 | Yang et al. | 370/276 |
| 5,418,966 | 5/1995 | Madduri | 710/200 |
| 5,454,108 | 9/1995 | Devarakonda et al. | 709/104 |
| 5,469,575 | 11/1995 | Madduri | 709/226 |
| 5,481,721 | 1/1996 | Serlet et al. | 709/303 |
| 5,504,899 | 4/1996 | Raz | 707/10 |
| 5,511,196 | 4/1996 | Shackelford et al. | 709/303 |
| 5,515,537 | 5/1996 | Tavares et al. | 710/244 |
| 5,535,212 | 7/1996 | Koopman et al. | 370/455 |
| 5,550,973 | 8/1996 | Forman et al. | 710/200 |
| 5,596,754 | 1/1997 | Lomet | 710/200 |
| 5,687,370 | 11/1997 | Garst et al. | 707/206 |
| 5,704,032 | 12/1997 | Badovinatz et al. | 714/4 |
| 5,721,825 | 2/1998 | Lawson et al. | 709/203 |
| 5,761,659 | 6/1998 | Bertoni | 707/8 |
| 5,765,174 | 6/1998 | Bishop | 707/206 |
| 5,832,529 | 11/1998 | Wollrath et al. | 707/206 |

ESTABLISHING CONTROL OF LOCK TOKEN FOR SHARED OBJECTS UPON APPROVAL MESSAGES FROM ALL OTHER PROCESSES

BACKGROUND OF THE INVENTION

1. Field of the Invention

This invention relates to a method of synchronizing access to shared objects among a plurality of processes in a distributed system.

2. Discussion of the Related Art

A plurality of processes in a distributed system must be synchronized for tasks that require work on shared objects (a shared object being one that can be accessed by more than one process). For example, if an object is accessed or modified by more than one process at a time, different processes may have a different view of the object's state—i.e., one process might believe that the object was unchanged (if it did not change the object) and another process might believe the changes it made to the object were saved. Because of this possibility for an inconsistent object state, there must be some manner of maintaining control over the access to a shared object.

SUMMARY OF THE INVENTION

The present invention provides coordinated access to a shared object in a distributed system by providing a method for allowing one and only one process to access a shared object at any given time. Once a process is finished with an object, another process can access the same. By thus serializing access to shared objects, inconsistent states are prevented.

Another aspect of the present invention is to provide fault tolerance. For example, when a process fails or is removed while having access to a shared object, it is necessary for the system to know that the process has failed and allow another process to access the object.

According to a method embodiment of the present invention, a lock token is associated with a given shared object. This lock token is transmitted around the distributed system, e.g., a network, and captured by a process when it desires control of the associated shared object. Only when a process has possession of the token can it access the object. When a process is finished with the token, it transmits the token to the next process requiring access. Additional steps are provided to rectify conflicts which occur when more than one process seeks to capture the token at the same time, and to prevent token loss if a process fails or is removed.

The capturing step may include requesting a lock token, determining whether at least one other process is also requesting the lock token, and if at least one other process is also requesting the lock token, generating a retry delay time period and at an expiration of such period, repeating the requesting and determining steps. Then, when no other process is also requesting the lock token and assuming the lock token does not yet exist, the first process generates the lock token.

The invention is further described with respect to the following detailed description and drawings, which are given by way of example only and are in no way restrictive.

DETAILED DESCRIPTION

The present embodiment is implemented using object-oriented programming methods, that is, the protocol logic is implemented by objects. A locking protocol object may be instantiated at many different levels of a distributed system in accordance with this invention.

In object-oriented programming, an object has state, behavior and identity. The structure and behavior of similar objects are defined in their common class. The state of an object encompasses all of the (usually static) properties of the object, plus the current (usually dynamic) values of each of these properties. An object's behavior is how it acts and reacts, in terms of its state changes and message passing. Generally, a message is simply an operation that one object performs upon another, although the underlying dispatch mechanisms may be different. In most object-oriented programming languages, operations that clients perform upon an object are declared as methods (functions), which are part of the class declaration. Thus, the behavior of an object is a function of its state as well as the operations performed upon it, with certain operations having the effect of altering the object's state.

One common object-oriented programming language is C++. For a further description of this and other object programming languages, see Grady Booch, "Object-Oriented Analysis And Design, With Applications," Benjamin/Cummins Publishing Company, Redwood City, Calif., 2nd Edition (1994).

Figure 1:
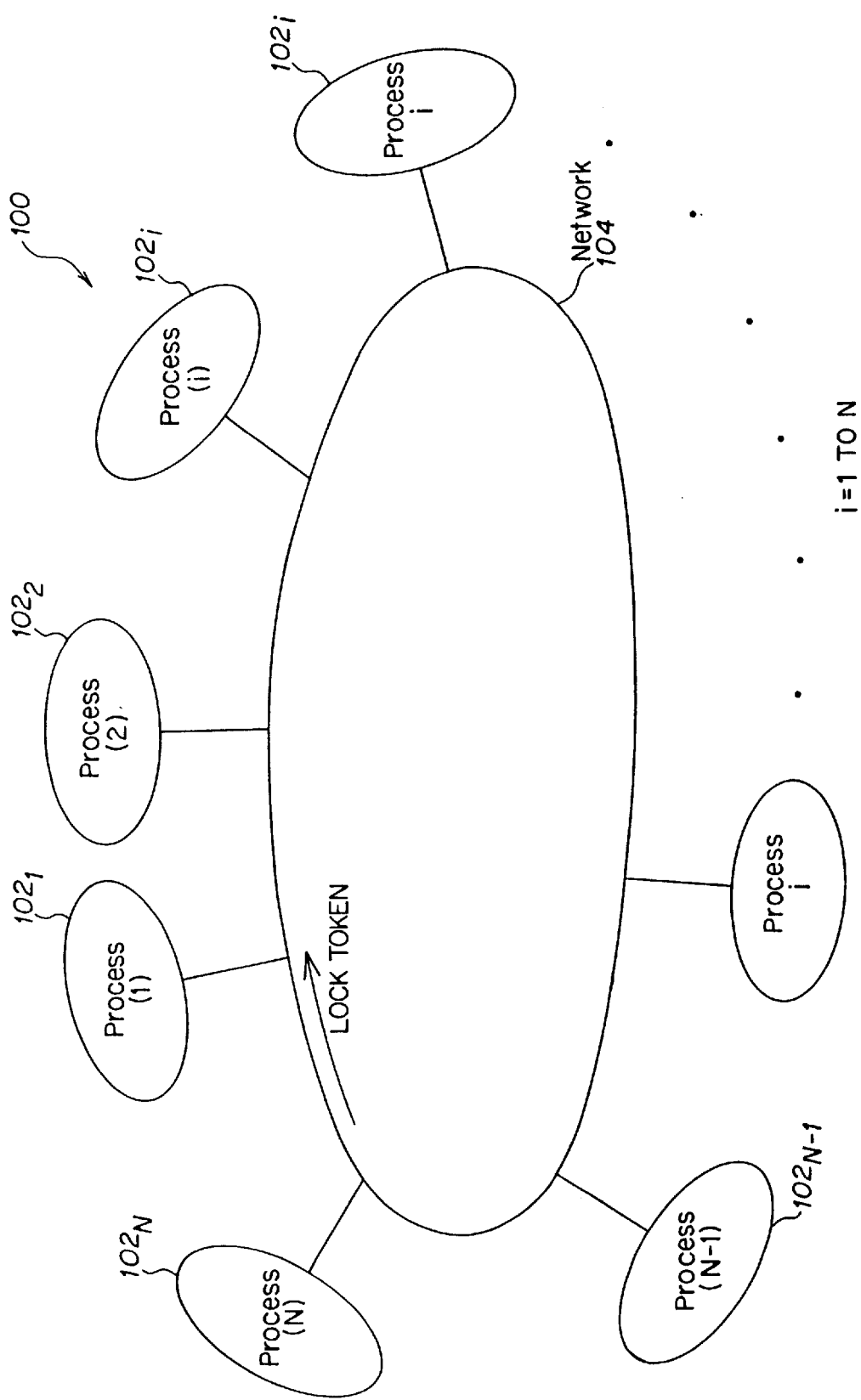
FIG. 1 is a schematic illustration of a lock token passing in a distributed process system such as a communications network.

FIG. 1 shows a plurality of processes $102_i$, i=1 to N, distributed in a communications network 100. Although the network topology 104 is shown as a ring, any topology can be used. The processes can run on various hardware platforms including, but not limited to: SunSparc 5, 10 or 20 running SunOS or Solaris operating systems; and Intel X86 (or i960) running Windows 3.1, Windows 95 or Windows NT (or an embedded OS in the case of the i960). The locking protocol of the present invention is generic in that it can be used with any set of communicating processes and/or processors appropriately connected to one another.

The locking protocol has two basic modes and the system, consisting of all of the processes (or peers), can be in only one of these two modes at any given time. The first mode is known as a contention mode, where there is no lock token in the system. In the contention mode, a lock token is generated so that the system can progress to a second mode known as the token-passing mode. In the token-passing mode, the lock token is passed from one process to another. The protocol generally operates in the token-passing mode, since once the token is generated it will exist until the current owner process is removed or exits from the system. Each of these modes will be discussed in greater detail below.

Messages

The locking protocol is managed with messages sent from one process to another. There are two basic types of messages: broadcast messages and unicast messages. Broadcast messages are more expensive (i.e., use more network resources) since one process is sending a message to every other process. A unicast message is simply a message from one process to another process.

There are three types of broadcast messages used:
1) lock_request;
2) notify_lock_acquired; and
3) lock_token_lost.

Each time a process wants the lock token, it requests the token from all of its peer processes by sending a lock_request. The requesting process then waits until it has received responses from all other processes before attempting to capture the lock token.

The notify_lock_acquired message is sent only after the lock token has been generated. This informs all peer processes that the lock token exists and that the system is now in token-passing mode (discussed in further detail below).

When a process is removed or fails, and if that process is believed to have owned the token, the lock_token_lost message is broadcast informing all of the processes that the token is lost. If the token was not actually lost and the present owner receives this message, the owner will notify the other processes that it possesses the token.

There are four types of unicast messages used:
1) send_lock_token_to;
2) send_lock_request_to;
3) access_granted; and
4) access_denied.

The lock token is passed from the previous token owner to the new token owner with the send_lock_token_to message.

If the system is in contention mode, any process trying to acquire the lock token asks a newly added process for the lock token by sending the send_lock_request_to message. One process indicates to another process interested in the token that the latter process can have the token by sending an access_granted message. Finally, one process indicates to a second process interested in the lock token that the second process cannot have the token by sending the access_denied message. The access_granted and access_denied messages received from the other process are used to decide the mode of the system and state of the process. These messages indicate what is the present state of the other process, and what is the mode of the system (according to the other process). This information allows a process to decide what action should be taken.

Contention Mode

The contention mode is the default mode used when the locking protocol is started. The system is in the contention mode only if the lock token does not exist, i.e., none of the processes has the lock token. The lock token is generated in this mode by the various processes contending for (seeking to obtain) the lock token. After the lock token has been generated, the system enters into the token-passing mode.

Figure 2:
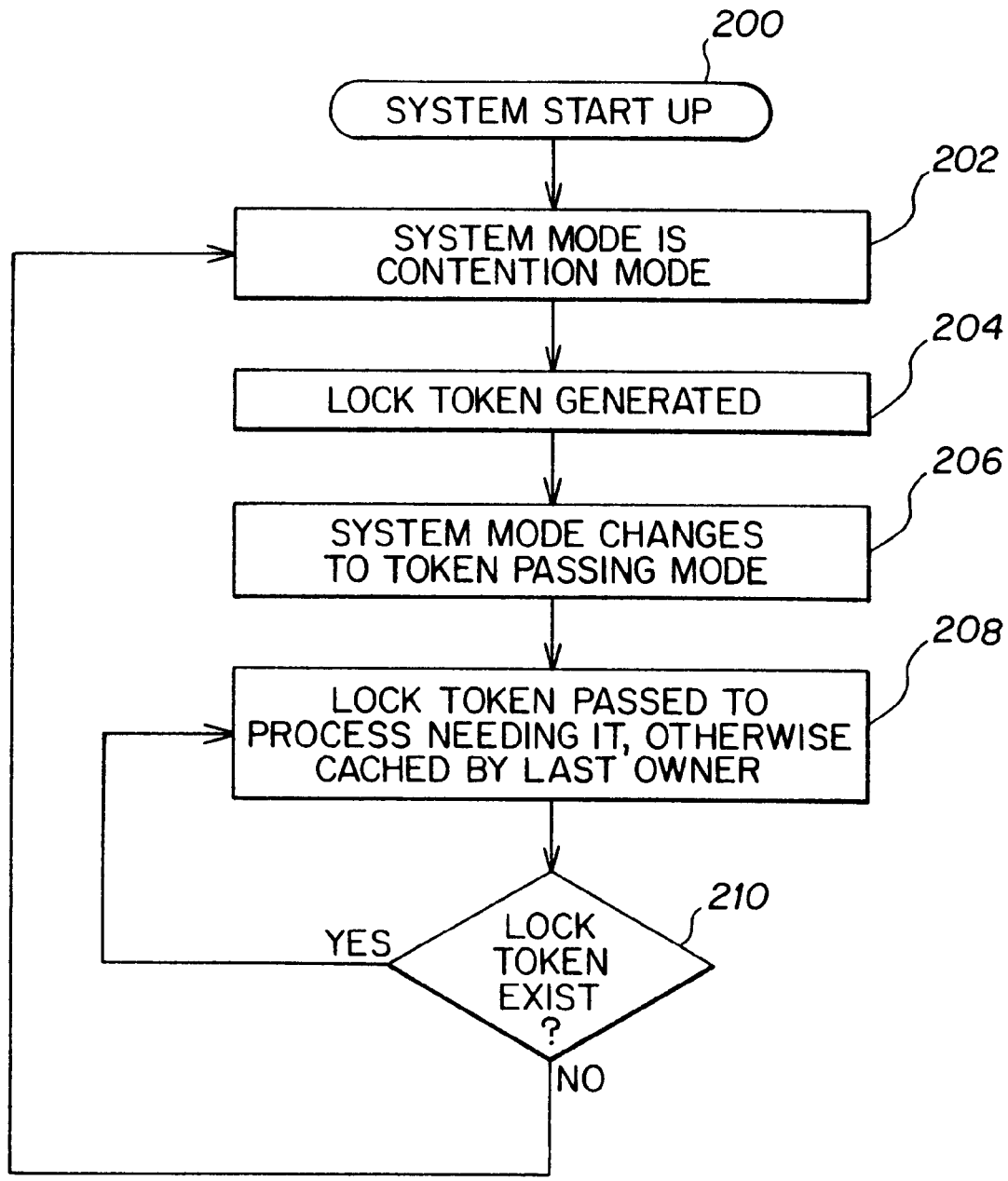
FIG. 2 is a flow chart of steps according to a method embodiment of the invention.

An overview of the system operation is shown in FIG. 2. The system starts-up (step 200) and enters the contention mode (step 202). The lock token is generated (step 204) and then the system mode changes to token-passing mode (step 206). The lock token is passed to a requesting process, otherwise it is stored by the last owner (step 208). Finally, a determination is made as to whether the lock token exists (step 210). If the lock token does exist, control passes to step 208; otherwise control passes back to step 202.

The system can enter the contention mode in one of two ways. On system start-up, the lock token does not exist and therefore the system is initialized in contention mode. The other way of entering the contention mode is when the owner process (the process having the token) is removed, thereby causing the token to be lost.

Figure 3:
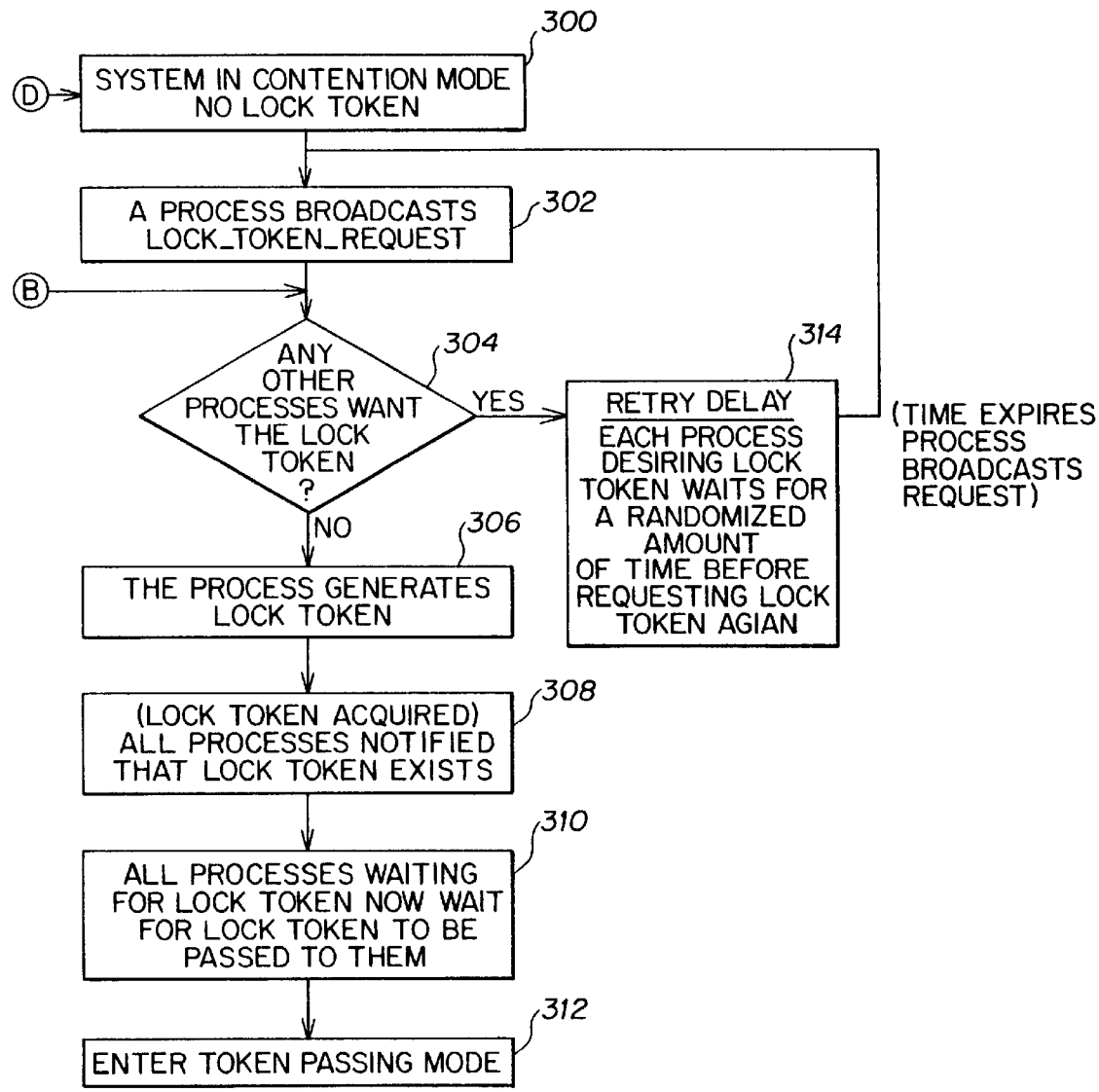
FIG. 3 is a more detailed flow chart of steps in a contention mode at system start-up.

System start-up in contention mode is shown in further detail in FIG. 3. Step 300 represents the system in contention mode without a lock token. In step 302, an interested process broadcasts a lock_token_request. In step 304, it is determined if any other processes are interested in the token. If not, control passes to step 306 and the one interested process obtains the token lock by generating the lock token. In step 308, the process that generated the lock token announces to all of the known processes that the lock token exists. In step 310, all processes that are waiting for the lock token now wait for it to be passed to them and in step 312, the token-passing mode is entered.

Returning now to step 304, if there are other processes that want the lock token, control passes to step 314. In effect, two or more processes have collided in their attempts to obtain the token at the same time. In step 314, each interested process recognizes that at least one other process is interested and they each wait a random retry delay period before again requesting the token. Each process will have a different retry delay, the generation of which will be described below in greater detail.

It should be noted that when a process is waiting for its retry delay period to end, the process will respond to any other process asking for the lock token with a message of access_granted. The only way a process can obtain the lock token in contention mode is when all of the other processes agree, i.e., a unanimous vote. In effect, since each contending process is delaying the reassertion of its request for the lock token, the one process which ends its delay first will request the lock token and those processes which are still waiting for their respective delay to elapse do not oppose the one process from generating the lock token.

After the retry delay period of a process has elapsed, the process tries to obtain the lock token by broadcasting a lock_request message. If two or more processes come out of the delay at the same time, they will be delayed again, but with a possibly longer delay time as the delay is proportional to the number of retries; a method is described hereinafter for minimizing the overall delay time. After contending for the lock token for some indeterminate amount of time, one of the processes will finally generate the lock token. Immediately after the token is generated, all of the processes will be notified that the lock token exists and the system will enter the token-passing mode as previously discussed (steps 306–312).

Retry Delay

Figure 4:
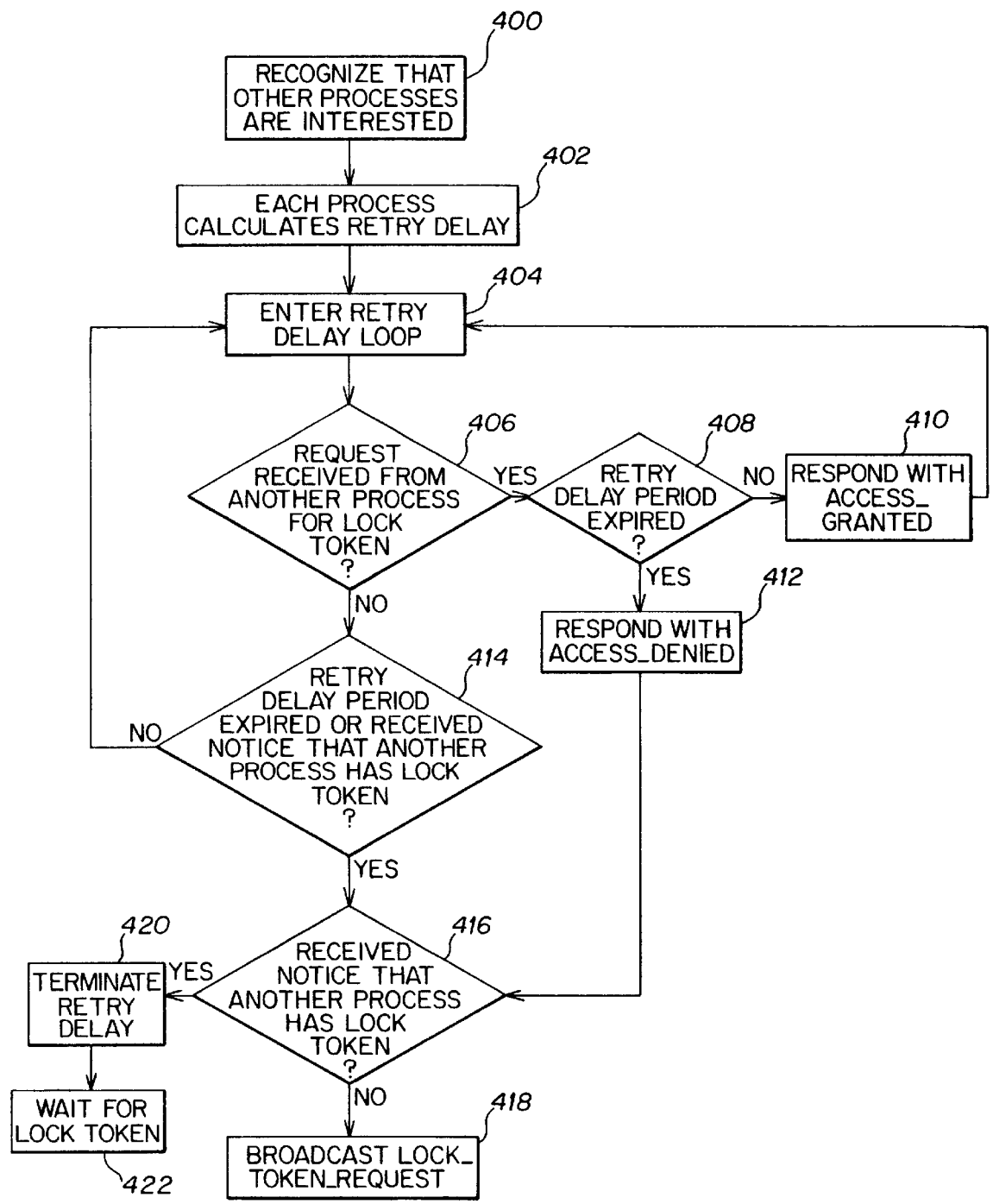
FIG. 4 is a more detailed flow chart of steps of a retry delay operation in the contention mode.

The retry delay (step 314 of FIG. 3) will now be discussed in more detail. The retry delay is used in the contention mode if two or more processes collide when attempting to obtain the lock token at the same time; it forces each contending process to wait a random amount of time before again trying to obtain the lock token. As shown in FIG. 4, each interested process first recognizes that there is at least one other process interested in the lock token (step 400). Each interested process then calculates its own retry delay (step 402), by for example, scaling a delay interval by a number chosen randomly from a look-up table. The discrete look-up table can be formed from any function, but in a particular embodiment, the function is the following:

$$f(x) = \left(\frac{x}{5} - 0.1\right)^{0.2} + 0.63 \qquad (1)$$

Figure 7:
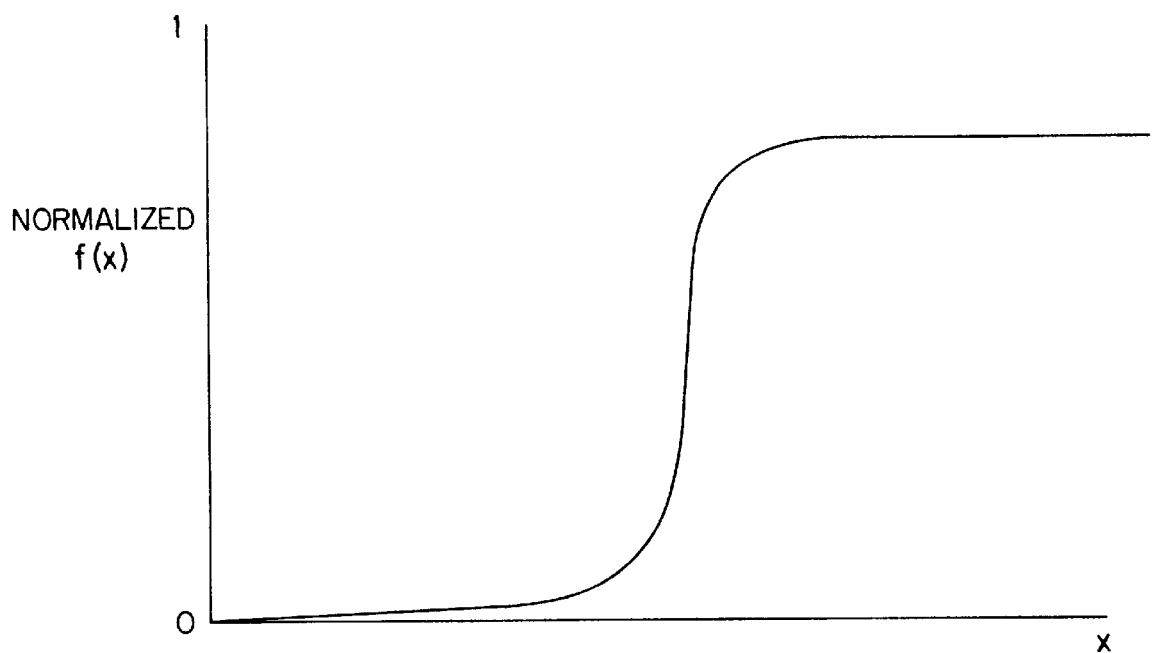
FIG. 7 is a graph of a function used to create a delay table.

This function, illustrated in FIG. 7, is discretely sampled and normalized to range from 0 to 1. It is important to note that the smallest possible delay is zero; therefore, a process could have no delay and instantaneously ask for the lock token again.

An index (x) into the table is randomly chosen using a random number generator. The value for the index in the look-up table is then scaled by certain scaling factors. One scaling factor is a delay factor (DF) which converts the delay to a unit of time related to the properties/delay characteristics of the system in which the protocol is running. Another scaling factor is a sum of the number of retries (R) plus the number of contending processes (C) squared (a contending process is a process interested in the lock token). As the number of retries (R) and the number of contending processes (C) increase, the maximum possible delay also increases. The retry delay equation is as follows:

$$\text{delay} = DF \cdot (R + C^2) \cdot f(x) \qquad (2)$$

As stated above, the delay factor DF is related to properties/delay characteristics of the system; R is the number of retries for the respective process; C is the total number of contending processes; and f(x) is the delay function where x is a random number. The sum: $R+C^2$, controls the delay spread.

Referring back to FIG. 4, the process enters the retry delay loop (step 404). It should be noted that while the flowchart of FIG. 4 is shown as a loop, it is implemented with timers and callbacks; in other words, the process is not really a loop, but is event driven. In step 406, when a request for the lock token is received from another process, control passes to step 408 where it is determined if the retry delay period (for the receiving process) has expired. If not, control passes to step 410 where a response allowing access (access_granted) is sent back to the requesting process and control returns to step 404. When, at step 408, the retry delay period has expired, an access_denied response is sent to the requesting process (step 412). When (at step 406) a request has not been received, control passes to step 414 where it is determined if the retry delay period has expired or if notice has been received that another process has the lock token. If (at step 414) the retry delay period has not expired or notice has not been received, then control returns to step 404; otherwise control passes to step 416 where it is determined if notice has been received that another process has the lock token. When the result of the determination of step 416 is no, then at step 418 the process broadcasts a lock_token_request. If (at step 416) it is determined that notice has been received that another process has the lock token, then control passes to step 420 and the retry delay is terminated at step 422 and the process waits for the lock token.

Token-Passing Mode

Figure 5:
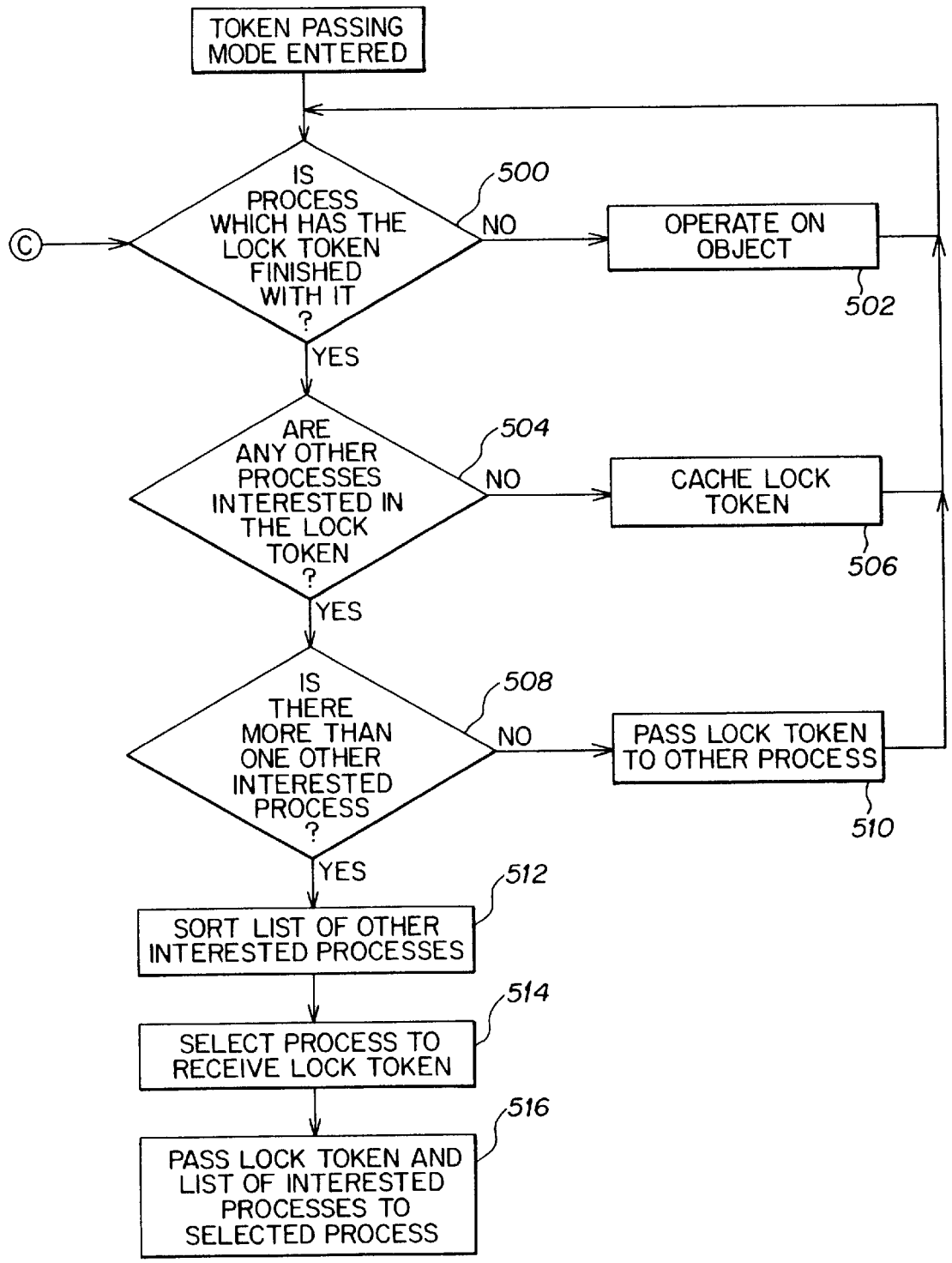
FIG. 5 is a more detailed flow chart of steps in a token-passing mode.

As shown in FIG. 5, once the token passing mode has been entered, it is determined whether the process having the lock token is finished using the object (step 500). If the process is not finished, control passes to step 502 where operations on the object are performed. If the process is finished, then at step 504 a determination is made as to whether there are any other processes interested in the lock token. If not, control passes to step 506 where the token is cached (stored). If another process becomes interested in the token while the current owner has it cached, the owner passes the token to the interested process; thus, the system stays in the token-passing mode at all times, even if none of the processes are interested in the token.

When there are other processes interested in the token (step 504), control passes to step 508 where a determination is made as to whether there is more than one interested process. If there is only one interested process then the token is passed to the interested process (step 510). If there is more than one interested process, then a list of interested processes is sorted (step 512) to select the next process to receive the token (step 514). The token is then passed to the selected process along with the list of interested processes (step 516).

When the lock token is generated and the notify_lock_acquired message is broadcast, any processes that are interested in the lock token are added to an interested processes list. Upon receiving the notify_lock_acquired message, these processes now wait idle for the lock token to be passed to them. If they were previously waiting on a retry delay, that delay is canceled and the process will no longer try to obtain the lock token. The process knows that the lock token will be passed to it in the future.

At some point the current lock token owner will complete its task. The lock token owner checks the list of interested processes and if the list is not empty (step 504), the lock token will be passed to one of the interested processes along with a list of remaining processes.

For example, the new lock token owner may be determined by sorting the list of interested processes deterministically and then selecting the process directly prior to the present lock token owner. This is accomplished by inserting the present lock token owner temporarily into the list to determine the next lock token owner. Essentially, the lock token is passed to the "left," or clockwise, around the circle of interested processes (see FIG. 1). This method of lock token passing guarantees that all interested processes will receive the lock token.

Referring to FIG. 1, if process $102_N$ is the present lock token owner and it has completed its operation requiring the token, and if processes $102_1$, $102_2$ are both in the list of interested processes, the lock token will be passed to process $102_1$ since it is to the "left" and the closest process to the present lock token owner (process $102_N$), while moving in a clockwise direction around the network.

When another process becomes interested in the lock token, the owner will add the new process to the list of interested processes and therefore the lock token will be passed to that process at some future point. Any interested processes will be told by the present owner (upon a lock request) to go to an idle state to wait for the lock token to be passed to it.

Adding or Removing Processes

Processes can be added or removed at any time. If a process is added to the system, all of the other processes are deterministically notified.

Figure 6:
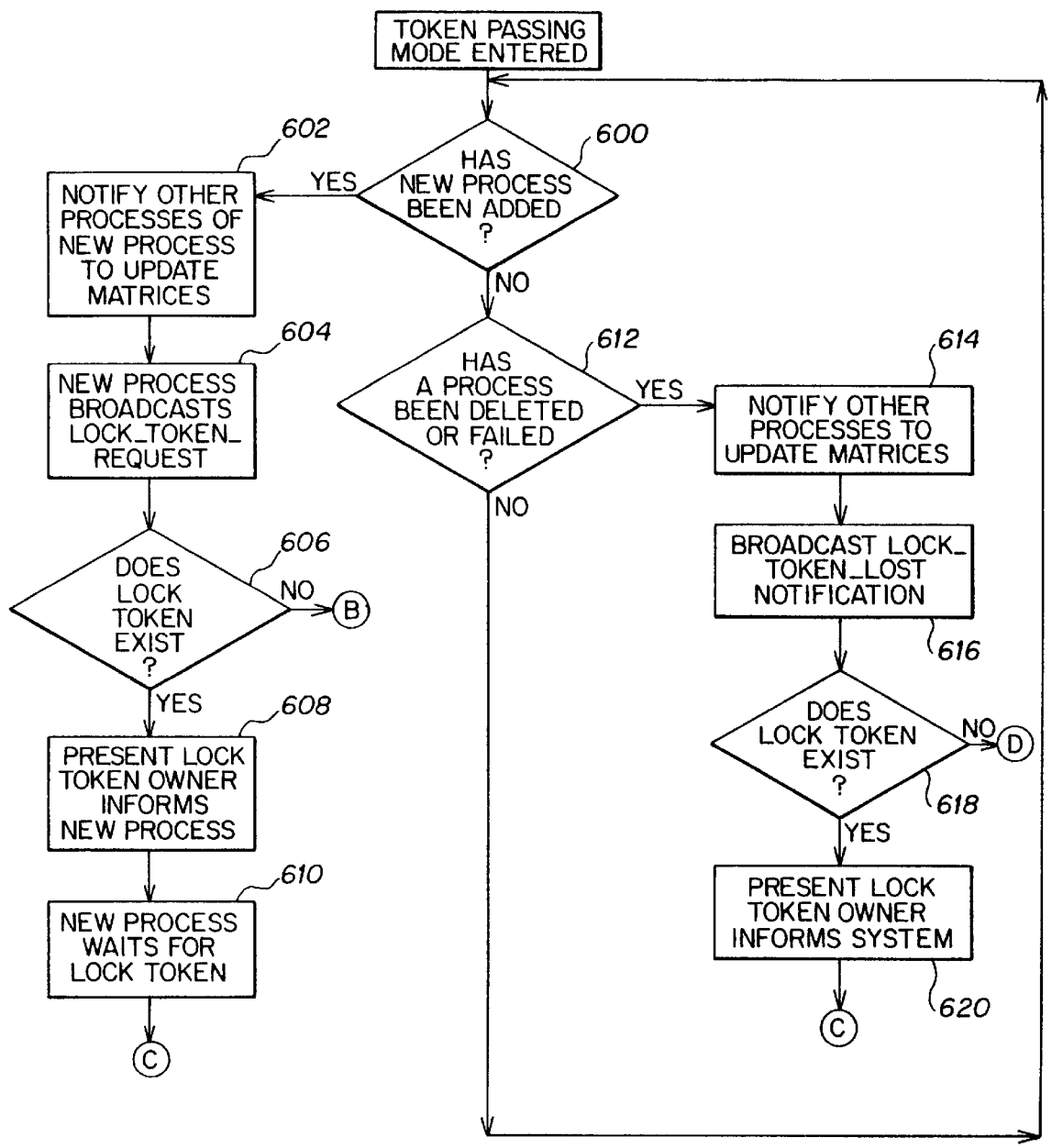
FIG. 6 is a flow chart of steps for adding or deleting a process from the network.

As shown in FIG. 6, in step 600 it is determined whether a new process has been added. If a new process has been added, the other processes are notified (step 602). The new process will always try to obtain the lock token by broadcasting a lock_token_request to all of its peer processes (step 604). At step 606, if the lock token does not exist then the process will proceed in normal contention mode fashion and control will go to step 304 as shown in FIG. 3. If the lock token does exist, control passes to step 608 and the new process will be informed by the present owner that the lock token does exist. The new process will be in the interested processes list and will obtain the lock token in the future. In step 610, the new process will wait until the lock token is passed to it and control goes to step 500, as shown in FIG. 5.

If it is determined (step 600) that a new process has not been added, then control passes to step 612 to determine if a process has been deleted or failed. This is event driven in that the determination of a deleted or failed process occurs when contact with an existing process is lost. If a process has been deleted or failed then all of the other processes are notified and their state matrices are updated (step 614). The locking protocol assumes the worst case when a process exits the system, i.e., each remaining process assumes that the lock token is lost and the system enters the contention mode. Each process remembers to which other process it passed the token; since the token passes in a circle around the network, if the removed or failed process obtained the token during the most recent traversal of the lock token around the circle, one of the processes will think that the removed or failed process had the token and the lock_token_lost notification will be sent (step 616). This ensures that all processes know that the token may be lost and therefore may need to be regenerated.

In step 618, it is determined if the lock token does exist. If the removed or failed process had the token, the interested processes will enter the contention mode (step 300 in FIG. 3) and the token will be generated. If the removed or failed process did not have the token, then the process which has the token will respond and inform the system that it has the token (step 620). The system will remain in the token-passing mode and the interested processes will wait for the token (control will pass from step 620 to step 500 as shown in FIG. 5).

The two modes of the locking protocol thus complement one another to create a fault-tolerant system. One of the purposes of the contention mode is to generate and regenerate the lock token. This non-deterministic mode of the system is efficient in determining which process should obtain the token and in allowing only one token to be created. The system is only in the contention mode if the processes jointly confirm that the token does not exist. As soon as the token is generated, it will continue to exist until the current owner is removed or fails. For a typical system, this will happen infrequently. If a process fails in the contention mode, there is no problem as the system is already in the mode that generates the lock token.

The token-passing mode deterministically passes the token from one interested process to another in an efficient and fair manner without any contention. Even though a new interested process begins in the contention mode, it will quickly enter the token-passing mode to join in and receive the token in its turn. The token-passing mode is fair in that any process interested in the token will receive it before another process receives it twice. Also, if none of the processes are interested in the token, the system as a whole is idle with no messages being sent.

Fault tolerance is achieved because a process maintains knowledge of the next process to which it passed the token. For example, if a first owner passes the token to a second owner, the first owner remembers that it passed the token to the second owner; then if the first owner hears that the second owner went down, the first owner assumes the token is lost and informs all other processes that a new token should be generated. However, if the token had already been passed to a third owner, the third owner will respond that the token exists and need not be regenerated. With this knowledge, the system becomes fault tolerant, since, at any time a process is removed or fails, such removal or failure is detected, and the system as a whole assumes the worst case, i.e., that the lock token has been lost. This avoids any deadlock conditions and insures that the lock token will be regenerated if indeed it has been lost. If the token was not lost, there is no harm done except for a few messages sent (i.e., the present owner will notify the system that it has possession of the token).

As the number of processes contending for a lock token increases, the lock acquisition time increases only linearly and not as a square of the number of contending processes.

Each contending process receives the token in a deterministic amount of time (i.e., based on determinable factors). In addition, the contention process is fair since each process contending for the token will receive the token an approximately equal number of times during the same time interval, because no process has priority over any other process during token acquisition.

In addition, the locking protocol is efficient since no messages are sent during steady state operation so that the network is not cluttered with extraneous transmissions.

Figure 8:
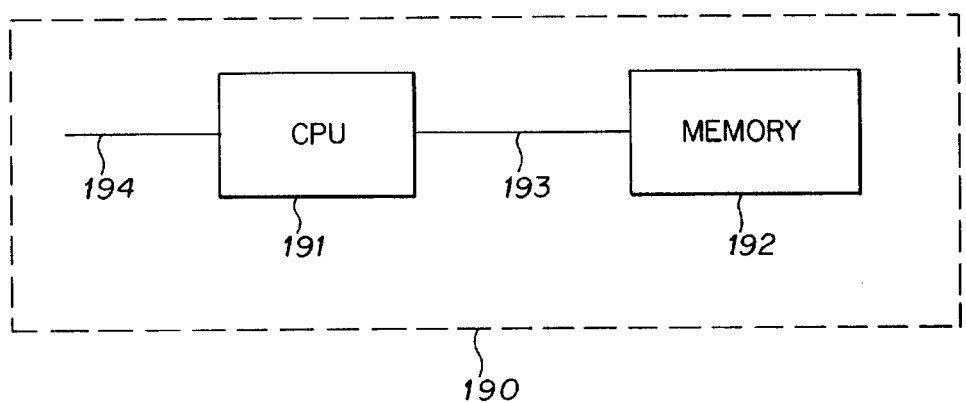
FIG. 8 is a schematic illustration of a computer apparatus for implementing the invention.

Any of the above embodiments may be implemented in a general purpose computer 190 as shown in FIG. 8. The computer may include a computer processing unit (CPU) 191, memory 192, a processing bus 193 by which the CPU can access the memory 192, and access to a network 194. Alternatively, the invention may be implemented as a memory, such as a floppy disk, compact disc, or hard drive, which contains a computer program or data structure, for providing general purpose computer instructions and data for carrying out the functions of the previous embodiments.

Having thus described various illustrative embodiments of the invention, various modifications will occur to those skilled in the art that are intended to be within the scope of the present invention. Thus, the foregoing description and accompanying drawings are provided by way of example only and are not intended to be limiting. The invention is defined by the following claims.

We claim:

1. A computer-implemented method of synchronizing a plurality of processes in a distributed system, the method comprising:

when a first process requires access to a shared object in an object-oriented programming environment, the first process establishing control of a transmittable lock token associated with the shared object and transmitting a message to each process of the plurality of processes indicating that the first process controls the lock token, wherein the first process establishes control in response to receiving an object control approval message from each other process in the plurality of processes.

2. The method of claim 1, wherein establishing control further comprises:

requesting the lock token; and when no other process is also requesting the lock token and when the lock token does not exist, the first process generating the lock token.

3. The method of claim 1, wherein establishing control includes:

requesting the lock token;

determining whether at least one other process is also requesting the lock token, and when at least one other process is also requesting the lock token, generating a retry delay time period, and at an expiration of the retry delay time period, repeating the requesting and determining steps, and when no other process is also requesting the lock token and when the lock token does not exist, the first process generating the lock token.

4. The method of claim 3, wherein the determining step includes:

granting access to another process requesting the lock token when the retry delay time period of the first process has not elapsed.

5. The method of claim 1, further comprising:

determining how many other processes are waiting for access to the shared object;

when only one other process is waiting for access to the shared object, defining the other process as a second process that needs access to the object and when the first process is done with the object, transmitting the lock token to the second process;

when more than one other process is waiting for access to the shared object, compiling a list of the other processes waiting for access to the object and determining which one of the other processes is to be the second process and when the first process is done with the object, transmitting the lock token and the list to the second process; and when no other process is waiting for the lock token, storing the lock token local to the first process.

6. The method of claim 5, wherein the step of determining the second process from the list includes choosing, as the second process, a process different from the first process which is positioned downstream from the first process in the distributed system.

7. In a computer network system, a method of controlling access to a shared object in an object-oriented programing environment accessible by a plurality of processes running concurrently on the network, the method comprising:

associating a transmittable lock token with the shared object;

allowing a process to access the shared object only when the process controls the associated lock token; and the process controlling the lock token transmitting a message to each process of the plurality of processes reporting that it controls the lock token, wherein the process establishes control of the lock token in response to receiving an object control approval message from each other process of the plurality of processes.

8. The method of claim 7, further comprising:

the process possessing the lock token passing the same to a next process seeking access to the shared object.

9. A system comprising:

a network interconnecting a plurality of processors; and each processor including:

means for establishing control of a transmittable lock token associated with a shared object in an object-oriented programming environment;

means for transmitting a message to each processor of the plurality of processors reporting that the respective processor has control of the lock token;

means for transmitting an object control approval message to each other processor of the plurality of processors; and means for operating on the shared object only when the processor has established control of the associated lock token by receiving an object control approval message from each other processor.

10. The system of claim 9, wherein each processor further comprises means for transmitting and receiving the lock token.

11. The system of claim 10, wherein each processor further comprises means for determining a next processor to which the lock token is to be transmitted.

12. The system of claim 9, wherein each processor further comprises means for requesting the lock token.

13. A computer-implemented method of coordinating operations among a plurality of processes interconnected by a computer network, the method comprising:

(A) receiving a request for access to a first shared object in an object-oriented programming environment from a first process of the plurality of processes;

(B) determining whether at least one other process is requesting access to the first shared object at a same time as the first process;

(C) when no other process is requesting access to the first shared object, granting access to the first shared object to the first process when each process of the plurality of processes sends a message agreeing to grant access to the first process; and (D) when the first process and at least one other process are requesting access to the shared object at the same time, delaying the first process from requesting access to the first object for a first delay time period and delaying the second process from requesting access to the first object for a second delay time period different from the first delay time period and repeating steps (A)–(C).

14. The method of claim 13, wherein step (C) comprises:

generating a first transmittable lock token associated with the first shared object; and sending the first lock token to the first process to indicate that the first process has sole access to the first shared object.

15. The method of claim 13, wherein step (D) includes steps of:

determining the first and second delay time periods according to the formula:

$$\text{delay} = DF \cdot (R + C^2) \cdot f(x)$$

where DF is a delay factor, R is a number of retries for the respective process of the plurality of processes, C is the total number of contending processes, and x is a random number from 0 to 1.

16. The method of claim 15, wherein $$f(x) = \left(\frac{x}{5} - 0.1\right)^{0.2} + 0.63$$

17. The method of claim 14, further comprising steps of:

(E) receiving a request from a third process for access to the first shared object;

(F) determining when the first process has completed operating on the first shared object; and (G) when the first process has completed operating on the first shared object, causing the first process to transfer the lock token to the third process giving sole access to the first object to the third process.

* * * * *